(12) United States Patent
Kim et al.

(10) Patent No.: US 7,012,946 B2
(45) Date of Patent: Mar. 14, 2006

(54) PHOTONIC CRYSTAL-BASED RESONANT CAVITY AND RESONATOR

(75) Inventors: Ji-deog Kim, Seoul (KR); Suk-han Lee, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 10/724,632

(22) Filed: Dec. 2, 2003

(65) Prior Publication Data

US 2004/0120380 A1     Jun. 24, 2004

(30) Foreign Application Priority Data

Dec. 2, 2002     (KR)  ................. 10-2002-0075770

(51) Int. Cl.
*H01S 3/08* (2006.01)
(52) U.S. Cl. .......................... 372/92; 372/97
(58) Field of Classification Search ............. 372/92, 372/97
See application file for complete search history.

(56) References Cited

U.S. PATENT DOCUMENTS

| | | | | |
|---|---|---|---|---|
| 5,440,421 | A * | 8/1995 | Fan et al. ................. | 359/245 |
| 6,058,127 | A * | 5/2000 | Joannopoulos et al. | |
| 6,483,640 | B1 | 11/2002 | Tonucci et al. | |
| 6,757,463 | B1 * | 6/2004 | Hutchinson et al. .......... | 385/37 |
| 6,819,691 | B1 * | 11/2004 | Fan ........................ | 372/20 |
| 6,873,777 | B1 * | 3/2005 | Bourelle .................. | 385/129 |
| 2001/0020373 | A1 | 9/2001 | Borrelli et al. | |
| 2005/0185254 | A1 * | 8/2005 | Moon et al. .............. | 359/321 |
| 2005/0200942 | A1 * | 9/2005 | Grot et al. ................ | 359/321 |

FOREIGN PATENT DOCUMENTS

KR     10-2003-0086656     11/2003

OTHER PUBLICATIONS

O.J. Painter, et al. "Room temperature photonic crystal defect lasers at near-infrared wavelength in InGaAsP", Journal of Lightwave technology, vol. 17, No. 11, Nov. 1999, pp. 2082-2088 ☐☐.*
Malkova, et al., *, Phys. Rev. B., vol. 66, pp. 115113-1 through 115113-11 (Sep. 26, 2002) *Entitled: "Symmetrical perturbation analysis of complex two-dimensional photonic crystals".

(Continued)

*Primary Examiner*—Min Sun Harvey
*Assistant Examiner*—Delma R. Flores-Ruiz
(74) *Attorney, Agent, or Firm*—Lee & Morse, P.C.

(57) ABSTRACT

A photonic crystal-based resonant cavity includes a first dielectric substance having a first dielectric permittivity, a plurality of second dielectric substances having a second dielectric permittivity and arranged in a first periodic structure with respect to at least one or more directions on a plane formed of the first dielectric substance, a plurality of third dielectric substances having a third dielectric permittivity and arranged in a second periodic structure with respect to at least one or more directions on the plane formed of the first dielectric substance, and disposed in unit cells formed by the plurality of second dielectric substances so as to be arranged in a third periodic structure together with the plurality of second dielectric substances, and one or more local defects formed to disrupt either the first periodic structure formed by the second dielectric substances or the second periodic structure formed by the third dielectric substances.

12 Claims, 5 Drawing Sheets

OTHER PUBLICATIONS

Simeonov, et al. , Physica B, vol. 228, No. 3-4, pp. 245-250 (Nov. 1996) Entitled: "Photonic band structure of zinc blende type periodic dielectric media".

Villeneuve, et al. *Entitled, Physical Review, B. Condensed Matter, 54(11):7837-7842 (Sep. 15, 1996) * "Microcavities in photonic crystals: Mode symmetry, tunability, and coupling efficiency".

Jin, et al., **, Optics Communications, vol. 188, No. 5-6, pp. 255-260 (Feb. 15, 2001) ***"Entitled: Microcavities composed of point defects and waveguides in photonic crystals".

Sigalas, et al. ***, Proceedings of the SPIE, vol. 4640, pp. 211-217, (Jan. 23, 2002) ***, Entitled: "Add-drop photonic crystal filters".

Yablonovitch, ****, Physical Review Letters, vol. 58, No. 20, pp. 2059-2062 (May 18, 1987) ****Entitled: "Inhibited spontaneous emisson in solid-state physics and electronics".

Cassagne, et al. ***** Physical Review B, Condensed Matter, 53(11), pp. 7134-7142 (Mar. 15, 1996) ***** Entitled: "Hexagonal photonic-band-gap structures".

* cited by examiner

PHOTONIC CRYSTAL-BASED RESONANT CAVITY AND RESONATOR

BACKGROUND OF THE INVENTION

1. Field of the Invention

The present invention relates to a resonant cavity. More particularly, the present invention relates to a resonant cavity using a photonic crystal.

2. Description of the Related Art

A photonic crystal may have a structure as small as a few micrometers to as large as a few hundred micrometers. A photonic crystal is an optical device formed in a regular, periodic arrangement of substances having different refractive indices or dielectric constants, which can form a complete band gap for preventing a specific polarization of waves from propagating therethrough as well as an absolute band gap for preventing light from propagating therethrough regardless of the polarization of the light. Accordingly, a photonic crystal is suitable for use in optic-related devices, such as filters, light waveguides, optic delay devices, lasers, and the like.

In general, photonic crystals may have three types of structures, such as one-dimensional, two-dimensional, and three-dimensional, depending on the number of directions of periodic structure. For such a photonic crystal, a variety of concrete shapes in each dimension has been proposed. For example, in a case of a two-dimensional photonic crystal, the crystal is characterized by a lattice shape, lattice constant, inserted rod shape, and so on. Further, when a circular rod is inserted, a complete band gap can be achieved that prevents light having a wavelength of approximately twice as long as a lattice constant from propagating in any direction in a periodic structure with proper selections of a radius thereof, a dielectric permittivity, and other similar characteristics.

FIG. 1 illustrates an elevated view of a conventional photonic crystal-based cavity. A cavity 10 has a periodic arrangement of air holes 14 and a local defect 16 disrupting the periodic arrangement in a dielectric slab 12 having a predetermined dielectric permittivity.

Here, the local defect 16 spatially confines electromagnetic fields and generates an electromagnetic mode in a band gap. Further, electromagnetic radiation in a direction vertical to a two-dimensional plane is confined by total internal reflection (TIR).

Accordingly, light incident through a structure having an ordered air hole arrangement 14 and a local defect 16 in the dielectric slab 12 can be captured on a portion of the local defect 16, through which it can be used as a cavity for a laser having a very high quality factor Q.

FIG. 2 illustrates a plan view of a structure of a conventional photonic crystal having a plurality of band gaps. Inserted in the structure of a photonic crystal having a plurality of band gaps are a plurality of second dielectric substances 25 having a second dielectric permittivity, the second dielectric substances 25 being arranged in a first periodic structure with respect to at least one or more directions on the plane formed by a first dielectric substance 21, e.g., a slab, having a first dielectric permittivity, and a plurality of third dielectric substances 25' having a third dielectric permittivity, the plurality of third dielectric substances 25' being arranged in a second periodic structure in a unit cell formed by the plurality of second dielectric substances 25. The plurality of second dielectric substances 25 and the plurality of third dielectric substances 25' are arranged to have a third periodic structure with respect to at least one or more directions.

Here, the plurality of third dielectric substances 25' can be used with the dielectric permittivity changing while the size thereof is maintained, or, can be used with the size varying while the dielectric permittivity is maintained. Further, the plurality of third dielectric substances 25' can be used while the size and the dielectric permittivity both vary at the same time.

FIG. 3 is a graph showing respective frequency gaps appearing when the magnitude of a radius of the third dielectric substance 25' varies. In this case, the photonic crystal includes the plurality of second dielectric substances 25 having a dielectric permittivity of 8.9, a radius R and a lattice constant "a" that are disposed in the first dielectric slab 21 having a dielectric permittivity $\in_a$ and the plurality of third dielectric substances 25' having a radius R' that are inserted in the central portions of the unit cells of the lattice structure of the plurality of second dielectric substances 25. The radius R' of the third dielectric substance take a value of $$\frac{0.2a}{5\sqrt{2}}, \frac{0.4a}{5\sqrt{2}}, \frac{0.6a}{5\sqrt{2}}, \frac{0.8a}{5\sqrt{2}}, \text{ and } \frac{0.2a}{\sqrt{2}}$$

which come from five equal divisions of a distance from $$0 \text{ to } \frac{0.2a}{\sqrt{2}}.$$

Meanwhile, in order for the final photonic crystal structure resulting from the insertion of the plurality of third dielectric substances 25' to become a scale version of $\sqrt{2}$ times, the radius R of the plurality of second dielectric substances 25 should be changed to have the five equal divisions between $$0.2a \text{ and } \frac{0.2a}{\sqrt{2}},$$

as the radius R' of the third dielectric substances 25' changes. When the direction of insertions are from left to right in FIG. 3, reference numeral 35', seen from the left, denotes a lower frequency value of a first band gap in the initial photonic crystal, and reference numeral 36' denotes an upper frequency value of the first band gap. Reference numeral 31' denotes a frequency at one insertion position where a band gap occurs during the insertions, reference numeral 31, seen from the right, denotes a lower frequency value of the first band gap in a finally inserted photonic crystal, and reference numeral 32 denotes an upper frequency value of the first band gap. Further, reference numeral 35 is a frequency value at one insertion position at which the band gap disappears.

Through interpolating periodic configuration and sizes of different dielectric substances as above, one is able to make a photonic crystal having a plurality of band gaps at desired positions.

Although the conventional photonic crystal structure is able to have a plurality of band gaps through the respective insertion of dielectric substances, it is not suitable for use as a cavity. Further, since a cavity using the conventional photonic crystal has a single band gap, it causes a problem in that a resonant mode can be formed only for a single wavelength of a single band.

SUMMARY OF THE INVENTION

Accordingly, in an effort to solve the above problem, it is a feature of an embodiment of the present invention to provide a photonic crystal-based cavity capable of forming a plurality of resonant modes with a plurality of band gaps.

It is another feature of an embodiment of the present invention to provide a photonic crystal-based cavity capable of tuning a lasing wavelength of a microlaser.

It is yet another feature of an embodiment of the present invention to provide a resonator having a plurality of filtering frequencies using a photonic crystal with a plurality of band gaps.

In order to provide the above features, a resonant cavity according to an embodiment of the present invention includes a first dielectric substance having a first dielectric permittivity, a plurality of second dielectric substances each having a second dielectric permittivity, the plurality of second dielectric substances being arranged in a first periodic structure with respect to at least one or more directions on a plane formed of the first dielectric substance, a plurality of third dielectric substances each having a third dielectric permittivity, the plurality of third dielectric substances being arranged in a second periodic structure with respect to at least one or more directions on the plane formed of the first dielectric substance, and being disposed in unit cells formed by the plurality of second dielectric substances so as to be arranged in a third periodic structure together with the plurality of second dielectric substances, and one or more local defects formed to disrupt either the first periodic structure formed by the second dielectric substances or the second periodic structure formed by the third dielectric substances.

Preferably, the third dielectric substances have the largest possible size that is capable of being inserted in a unit cell formed by the plurality of second dielectric substances without overlapping the second dielectric substances.

The plurality of third dielectric substances may be additionally disposed on border lines between the unit cells formed by the plurality of second dielectric substances.

Preferably, the second dielectric permittivity is greater than the first dielectric permittivity. Preferably, the third dielectric permittivity is greater than the first dielectric permittivity and less than the second dielectric permittivity.

The one or more defects may be formed by omitting dielectric substances at a predetermined position in the first periodic structure of the plurality of second dielectric substances or in the second periodic structure of the plurality of third dielectric substances. Alternately, the one or more defects may be formed by changing a size or a shape of one or more of the plurality of second dielectric substances at a predetermined position in the first periodic structure of the plurality of second dielectric substances or by changing a size or a shape of one of one or more the plurality of third dielectric substances in the second periodic structure of the plurality of third dielectric substances.

The photonic crystal-based resonant cavity may further include a waveguide in the first dielectric substance for causing electromagnetic waves to reach the one or more defects.

In order to provide the above feature of an embodiment of the present invention, a photonic crystal-based resonator includes a cavity having a first dielectric substance having a first dielectric permittivity, a plurality of second dielectric substances each having a second dielectric permittivity, the plurality of second dielectric substances being arranged in a first periodic structure with respect to at least one or more directions on a plane formed of the first dielectric substance, a plurality of third dielectric substances each having a third dielectric permittivity, the plurality of third dielectric substances being arranged in a second periodic structure with respect to at least one or more directions on the plane formed of the first dielectric substance, and being disposed in unit cells formed by the plurality of second dielectric substances so as to be arranged in a third periodic structure together with the plurality of second dielectric substances, and one or more local defects formed to disrupt the first periodic structure formed by the plurality of second dielectric substances or the second periodic structure formed by the plurality of third dielectric substances; a first waveguide in the first dielectric substance and integrated adjacent to the one or more defects for causing electromagnetic waves to reach the one or more defects; and a second waveguide in the first dielectric substance integrated adjacent to the one or more defects for outputting the electromagnetic waves generated by the cavity in a desired direction.

Preferably, the first waveguide is an input waveguide for channeling incident electromagnetic waves to the one or more defects. Preferably, the second waveguide is an output waveguide for emitting electromagnetic waves generated by the cavity formed by the one or more defects in a desired output direction.

According to an embodiment of the present invention, the first waveguide and the second waveguide may be formed either on opposite sides of the one or more defects or on the same side of the one or more defects.

A cavity according to an embodiment of the present invention is able to form a plurality of electromagnetic resonant modes having different Q values through a photonic crystal structure having a plurality of band gaps.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
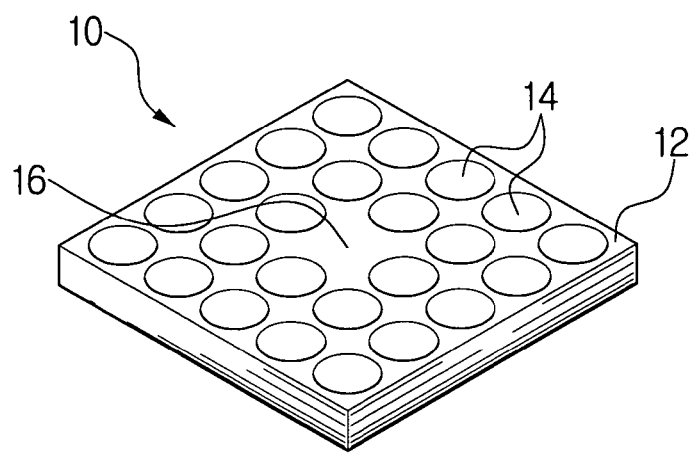
FIG. 1 illustrates an elevated view of a conventional photonic crystal-based cavity.
Figure 2:
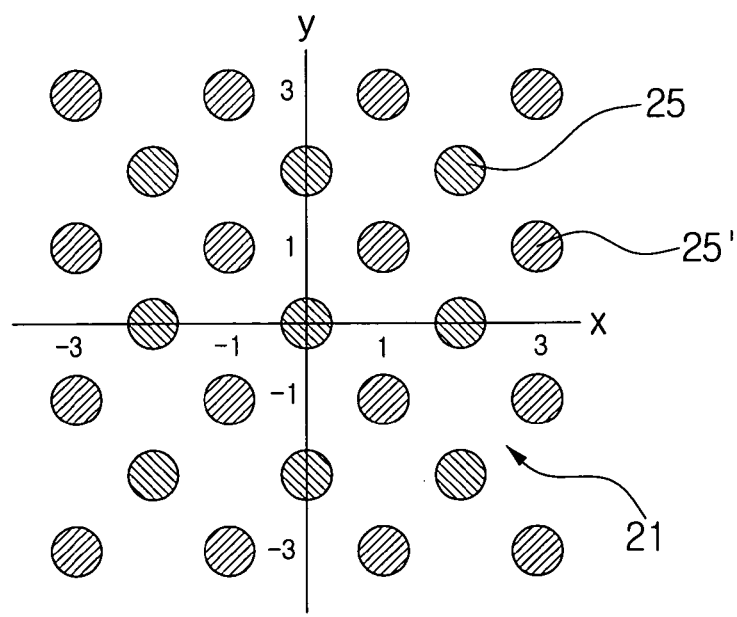
FIG. 2 illustrates a plan view of a conventional photonic crystal having a two-dimensional structure.

Korean Patent Application No. 2002-75770, filed on Dec. 2, 2002, and entitled: "Photonic Crystal-Based Resonant Cavity and Resonator," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the following description and drawings, a single representative reference numeral is used for a plurality of like members, and it is understood that a name on a single member may denote a plurality of members. Like numbers refer to like elements throughout.

Figure 4A:
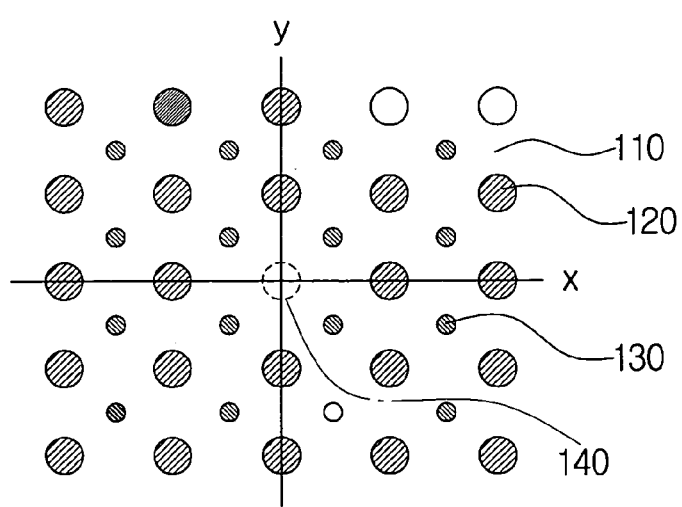
FIGS. 4A, 4B, and 4C illustrate plan views of photonic crystal-based cavities according to respective embodiments of the present invention.
Figure 4B:
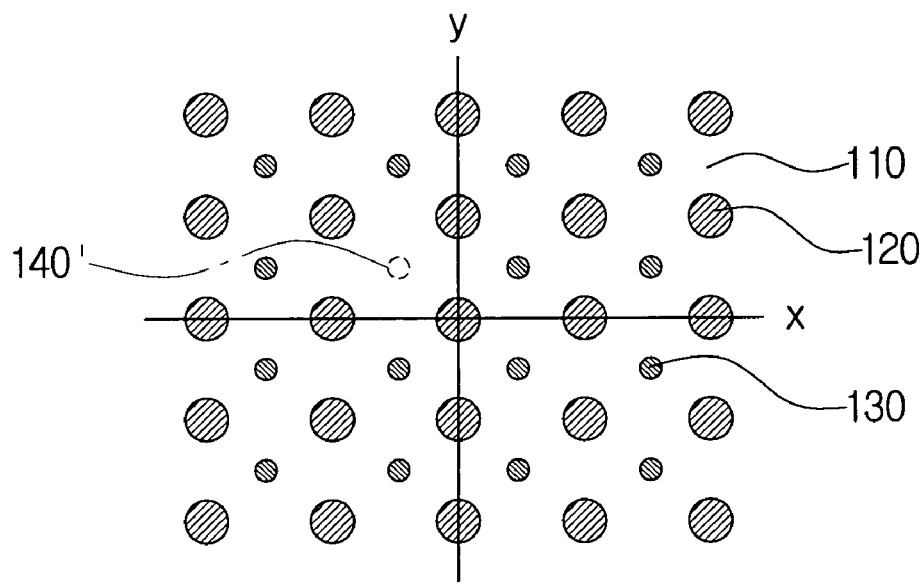
Figure 4C:
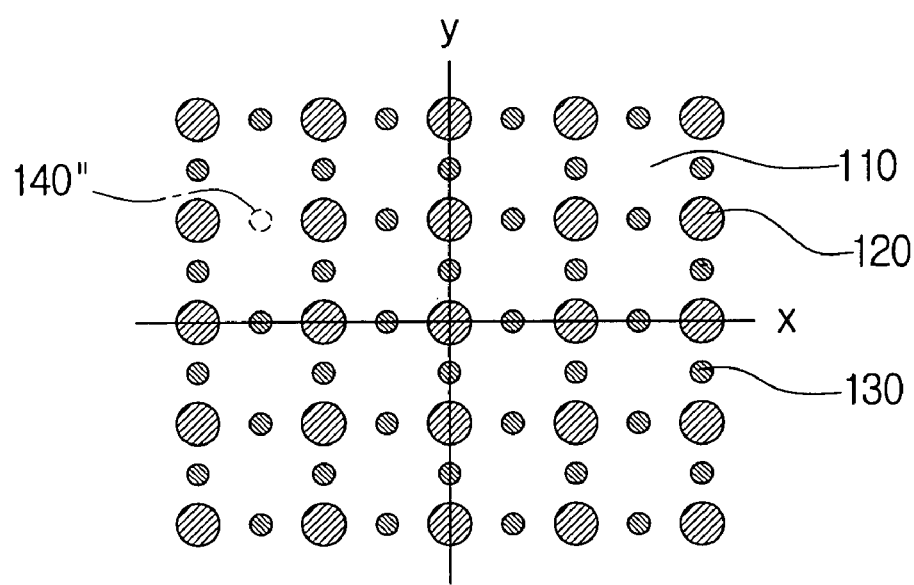

FIGS. 4A, 4B, and 4C illustrate plan views of a structure of a photonic crystal-based cavity according to respective embodiments of the present invention. A cavity of FIG. 4A includes a plurality of second dielectric substances 120 arranged in a first periodic structure in a first dielectric substance 110, preferably a first dielectric slab, having a first dielectric permittivity, a plurality of third dielectric substances 130 arranged in a second periodic structure, and a defect 140 disrupting the periodic structure of the plurality of second dielectric substances 120. Further, a cavity of FIG. 4B includes the plurality of second dielectric substances 120 arranged in the first periodic structure in the first dielectric slab 110, the plurality of third dielectric substances 130 arranged in the second periodic structure, and a defect 140' disrupting the periodic structure of the plurality of third dielectric substances 130.

Here, each of the plurality of second dielectric substances 120 have a second dielectric permittivity and each of the plurality of third dielectric substances 130 have a third dielectric permittivity. In this embodiment, the first dielectric permittivity is less than the second dielectric permittivity, and the third dielectric permittivity has a value that is greater than the first dielectric permittivity and less than the second dielectric permittivity. Further, the plurality of third dielectric substances 130 are arranged so that a distance from a center of the third dielectric substance 130 to an outermost edge of the third dielectric substance 130 is smaller than a distance from the center of the third dielectric substance 130 to the second dielectric substances 120 positioned nearest the third dielectric substance 130. That is, the third dielectric substances 130 have the largest possible size that is capable of being inserted in a unit cell formed by the plurality of second dielectric substances 120 without overlapping the second dielectric substances 120.

Additionally, in this embodiment, the third dielectric substances 130, as may be seen in FIG. 4C, are arranged in centers of unit cells formed by the second dielectric substances 120. In addition, the third dielectric substances 130 may be positioned, when used, on the border lines between the unit cells formed by the second dielectric substances 120. Further, the defects 140, 140', and 140", shown in FIGS. 4A, 4B, and 4C, respectively, are formed by omitting a dielectric substance from the periodic structure of the plurality of second or third dielectric substances 120 and 130. Such an omission to form a defect 140, 140', or 140", however, is not limited to omitting only one dielectric substance. The defect 140, 140', or 140" may be formed by omitting a plurality of dielectric substances at a predetermined position from the periodic structures of the second dielectric substances 120 or the third dielectric substances 130. Further, the defects 140, 140' and 140" are formed not only by providing deficiencies in the dielectric substances, but may also be formed by changing a size or a shape of one or more of the dielectric substances of the second and third dielectric substances 120 and 130, respectively, at a predetermined position in the first periodic structure or the second periodic structure, respectively.

Figure 3:
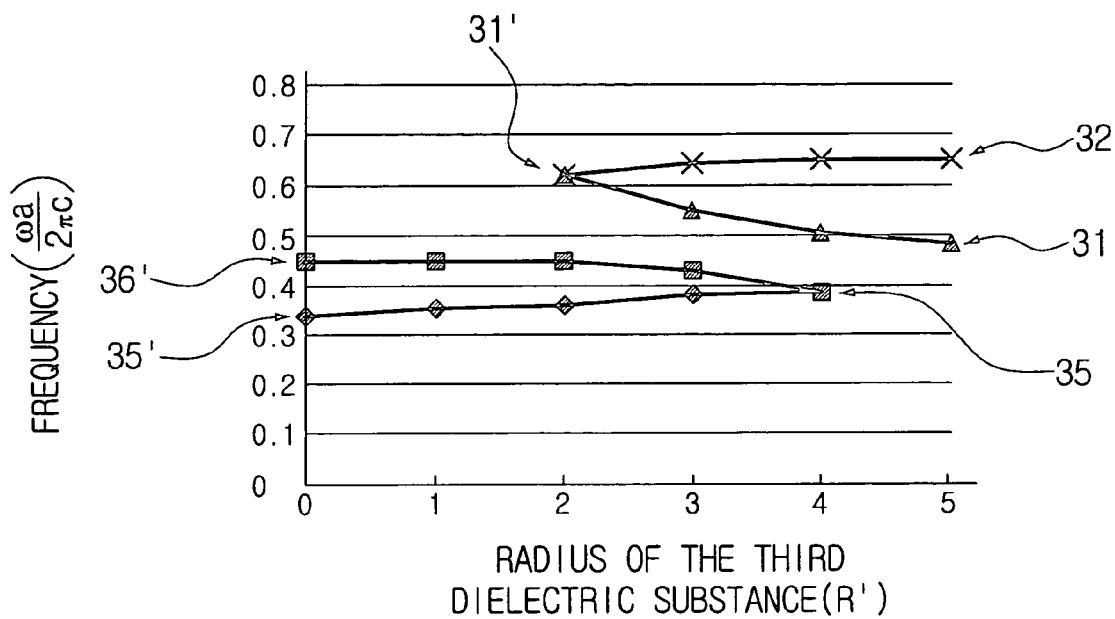
FIG. 3 is a graph showing a plurality of band gaps based on a conventional photonic crystal having the plurality of band gaps.
Figure 5:
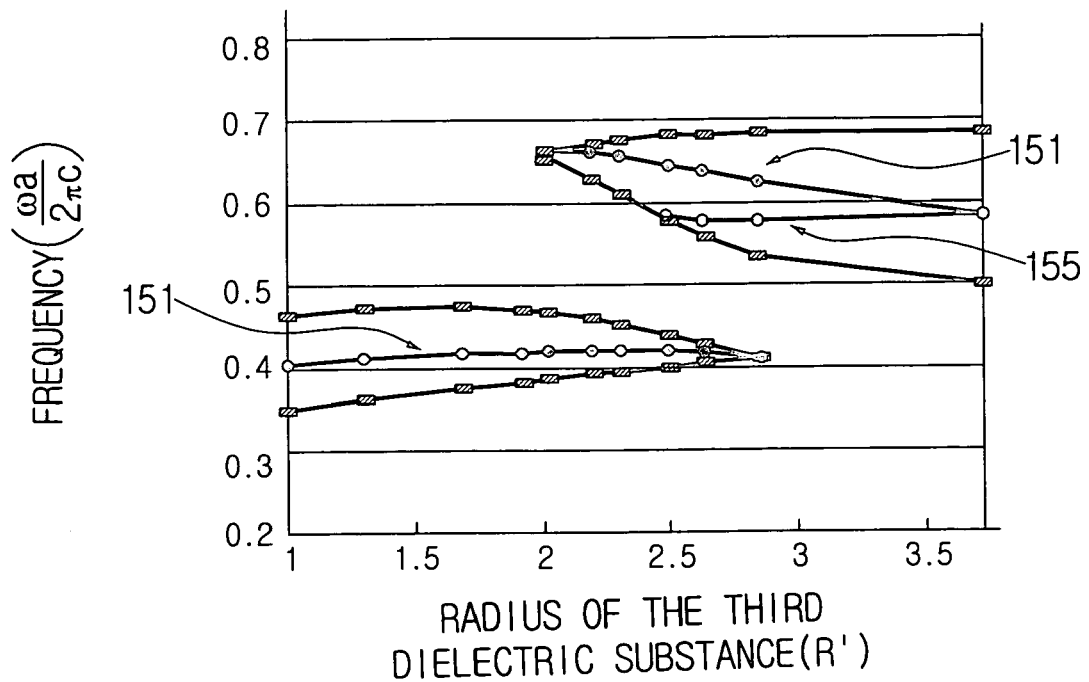
FIG. 5 is a graph showing band gaps and resonant frequencies according to the photonic crystal-based cavities of FIGS. 4A, 4B, and 4C.

FIG. 5 is a graph showing band gaps and resonant frequencies occurring from the cavities of the FIGS. 4A, 4B and 4C. As compared to FIG. 3, there exist slight differences in band gap positions, but the differences are caused by errors generated during simulations. In FIG. 5, a solid dot line denoted by reference numeral 151 corresponds to resonant frequencies in a band gap formed when one of the plurality of second dielectric substances 120, as shown in FIG. 4A, is missing, and a solid dotted line denoted by reference numeral 155 corresponds to resonant frequencies in a band gap formed when one of the plurality of third dielectric substances 130, as shown in FIG. 4B, is missing. The other various conditions of the photonic crystal are generally identical to the conditions as shown in FIG. 3. However, the x-axis coordinates are expressed in an exponential power of 1.3 with respect to 0, 1, 2, 3, 4, and 5 obtained from five equal divisions of a distance from $$0 \text{ to } \frac{0.2a}{\sqrt{2}}$$

with reference to a size of the third dielectric substance 130.

In FIG. 5, when one of the plurality of second dielectric substances 120 is missing, as shown in FIG. 4A, a resonant mode is formed only in a low band gap of band gaps when the insertions just started, but, thereafter, a resonant mode begins to form even in the high band gap so that resonant modes exist in both the low and high band gaps. Thereafter as the insertions still progress further, the resonant mode of the low band gap disappears together with the band, and the resonant mode exists only in the high band gap. That is, in the case of the resonant cavity as shown in FIG. 4A, it may be seen that the resonant modes simultaneously exist in the high band gap and the low band gap in the middle of the insertions. Meanwhile, in the case of missing one of the plurality of third dielectric substances 130, a resonant mode exists only at the side of the high band gap. That is, with the progress of the insertions, a resonant mode is not formed in the low band gap, but after the high band gap is formed, a resonant mode begins to form from the high band gap. Further, when reached at the last position of the insertions, the resonant mode coincides with the resonant mode for the second dielectric substances 120.

As a result, if any one of the plurality of second and third dielectric substances 120 and 130 is missing, a plurality of band gaps exist in the middle positions of the insertions, and electromagnetic resonant modes exist in the low band gap and the high band gap, respectively. Here, the positions and quality factor (Q) values of the resonant modes can be adjusted by changing the concrete shapes of the inserted dielectric substances and the shapes of the local defects.

Figure 6:
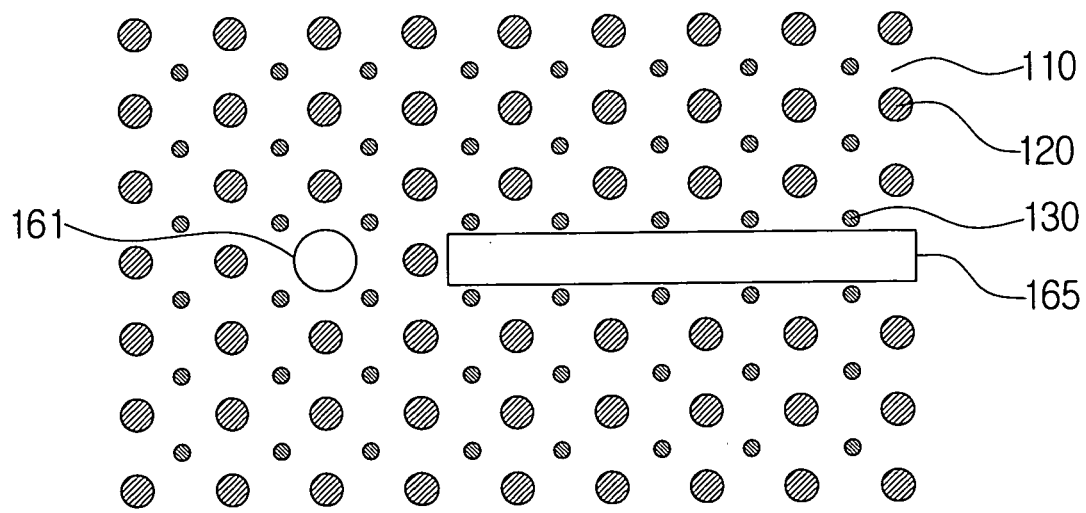
FIG. 6 illustrates a plan view of a photonic crystal cavity according to another embodiment of the present invention.

FIG. 6 illustrates a plan view of a photonic crystal-based resonant cavity according to another embodiment of the present invention. A cavity includes the plurality of second dielectric substances 120 arranged in the first periodic structure in the first dielectric slab 110 having a first dielectric permittivity, the plurality of third dielectric substances 130 arranged in the second periodic structure, and a defect 161 disrupting the periodic structure of the plurality of second dielectric substances 120, and a waveguide 165 integrated adjacent to the defect 161 for causing electromagnetic waves to reach the defect 161.

The cavity as shown in FIG. 6 is used in a semiconductor laser diode and the like so that light emitted from a microlaser through the waveguide 165 can be immediately combined. Further, since a plurality of resonant modes are available in the cavity, the cavity can be applied to a laser diode or the like having a plurality of lasing wavelengths in a set wavelength range.

Figure 7A:
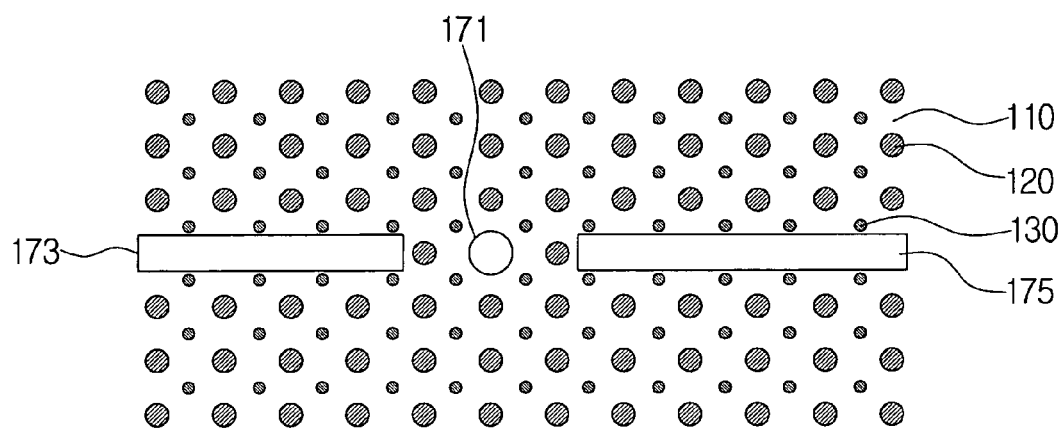
FIGS. 7A and 7B illustrate a plan view of a photonic crystal-based resonator according to respective embodiments of the present invention.
Figure 7B:
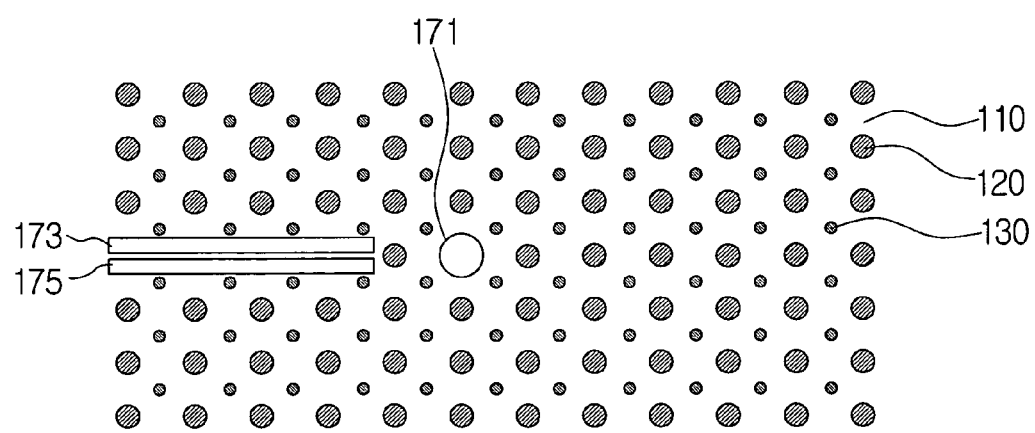

FIGS. 7A and 7B illustrate a plan view of a photonic crystal-based resonator according to respective embodiments of the present invention. The resonator includes a cavity having the plurality of second dielectric substances 120 arranged in the first periodic structure in the first dielectric slab 110 having a first dielectric permittivity, the plurality of third dielectric substances 130 arranged in the second periodic structure, and a defect 171 disrupting the periodic structure of the plurality of second dielectric substances 120; an input waveguide 173 integrated adjacent to the defect 171 so that incident electromagnetic waves can be channeled to the defect 171; and an output waveguide 175 integrated adjacent to the defect 171 so that electromagnetic waves generated by the cavity formed by the defect 171 are emitted in a desired output direction.

Although FIG. 7A illustrates the input waveguide 173 and the output waveguide 175 being formed on opposite sides of the defect 171, in an alternate embodiment as shown in FIG. 7B, the input waveguide 173 and the output waveguide 175 may be formed on the same side of the defect 171.

The resonator as shown in FIGS. 7A and 7B can emit through the output waveguide 175 an electromagnetic wave of a desired wavelength out of electromagnetic wave energy transmitted through the input waveguide 173. Likewise, the resonator has a plurality of resonant modes so that it can be used as a filter or the like that requires the plurality of resonant modes.

The cavity and resonator using a photonic crystal structure according to an embodiment of the present invention have a plurality of electromagnetic resonant modes available in a plurality of band gaps so that they are able to promote the development of diverse devices, such as a microlaser diode having a plurality of lasing wavelengths finely separated, a resonant filter having a plurality of resonant frequencies, and the like.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A photonic crystal-based resonant cavity, comprising:
   a first dielectric substance having a first dielectric permittivity;
   a plurality of second dielectric substances each having a second dielectric permittivity, the plurality of second dielectric substances being arranged in a first periodic structure with respect to at least one or more directions on a plane formed of the first dielectric substance;
   a plurality of third dielectric substances each having a third dielectric permittivity, the plurality of third dielectric substances being arranged in a second periodic structure with respect to at least one or more directions on the plane formed of the first dielectric substance, and being disposed in unit cells formed by the plurality of second dielectric substances so as to be arranged in a third periodic structure together with the plurality of second dielectric substances; and
   one or more local defects formed to disrupt either the first periodic structure formed by the second dielectric substances or the second periodic structure formed by the third dielectric substances.

2. The photonic crystal-based resonant cavity as claimed in claim 1, wherein the third dielectric substances have the largest possible size that is capable of being inserted in a unit cell formed by the plurality of second dielectric substances without overlapping the second dielectric substances.

3. The photonic crystal-based resonant cavity as claimed in claim 1, wherein the plurality of third dielectric substances are disposed on border lines between the unit cells formed by the plurality of second dielectric substances.

4. The photonic crystal-based resonant cavity as claimed in claim 1, wherein the second dielectric permittivity is greater than the first dielectric permittivity.

5. The photonic crystal-based resonant cavity as claimed in claim 4, wherein the third dielectric permittivity is greater than the first dielectric permittivity and less than the second dielectric permittivity.

6. The photonic crystal-based resonant cavity as claimed in claim 1, wherein the one or more defects are formed by omitting dielectric substances at a predetermined position in the first periodic structure of the plurality of second dielectric substances or in the second periodic structure of the plurality of third dielectric substances.

7. The photonic crystal-based resonant cavity as claimed in claim 1, wherein the one or more defects are formed by changing a size or a shape of one or more of the plurality of second dielectric substances at a predetermined position in the first periodic structure of the plurality of second dielectric substances or by changing a size or a shape of one of one or more the plurality of third dielectric substances in the second periodic structure of the plurality of third dielectric substances.

8. The photonic crystal-based resonant cavity as claimed in claim 1, further comprising a waveguide in the first dielectric substance for causing electromagnetic waves to reach the one or more defects.

9. A resonator having a plurality of filtering frequencies, comprising:
   a cavity having:
      a first dielectric substance having a first dielectric permittivity;
      a plurality of second dielectric substances each having a second dielectric permittivity, the plurality of second dielectric substances being arranged in a first periodic structure with respect to at least one or more directions on a plane formed of the first dielectric substance;
      a plurality of third dielectric substances each having a third dielectric permittivity, the plurality of third dielectric substances being arranged in a second periodic structure with respect to at least one or more directions on the plane formed of the first dielectric substance, and being disposed in unit cells formed by the plurality of second dielectric substances so as to be arranged in a third periodic structure together with the plurality of second dielectric substances; and one or more local defects formed to disrupt the first periodic structure formed by the plurality of second dielectric substances or the second periodic structure formed by the plurality of third dielectric substances;

a first waveguide in the first dielectric substance and integrated adjacent to the one or more defects for causing electromagnetic waves to reach the one or more defects; and a second waveguide in the first dielectric substance integrated adjacent to the one or more defects for outputting the electromagnetic waves generated by the cavity in a desired direction.

10. The resonator having a plurality of filtering frequencies as claimed in claim 9, wherein the first waveguide is an input waveguide for channeling incident electromagnetic waves to the one or more defects.

11. The resonator having a plurality of filtering frequencies as claimed in claim 9, wherein the second waveguide is an output waveguide for emitting electromagnetic waves generated by the cavity formed by the one or more defects in a desired output direction.

12. The resonator having a plurality of filtering frequencies as claimed in claim 9, wherein the first waveguide and the second waveguide may be formed either on opposite sides of the one or more defects or on the same side of the one or more defects.

* * * * *